(12) United States Patent
Fujii et al.

(10) Patent No.: US 9,158,447 B2
(45) Date of Patent: Oct. 13, 2015

(54) PORTABLE COMMUNICATION TERMINAL AND DISPLAY METHOD

(75) Inventors: Takatoshi Fujii, Daito (JP); Keiji Horiuchi, Daito (JP); Yutaka Uehara, Daito (JP)

(73) Assignee: KYOCERA Corporation, Kyoto (JP)

( * ) Notice: Subject to any disclaimer, the term of this patent is extended or adjusted under 35 U.S.C. 154(b) by 183 days.

(21) Appl. No.: 13/359,212

(22) Filed: Jan. 26, 2012

(65) Prior Publication Data

US 2012/0194456 A1   Aug. 2, 2012

(30) Foreign Application Priority Data

Jan. 27, 2011   (JP) ................................. 2011-015112

(51) Int. Cl.
| | | |
|---|---|---|
| G06F 3/041 | (2006.01) | |
| G06F 3/0488 | (2013.01) | |
| G06F 1/16 | (2006.01) | |
| G06F 3/14 | (2006.01) | |
| G06F 3/147 | (2006.01) | |

(52) U.S. Cl.
CPC ............ *G06F 3/0488* (2013.01); *G06F 1/1624* (2013.01); *G06F 1/1641* (2013.01); *G06F 1/1643* (2013.01); *G06F 3/147* (2013.01); *G06F 3/1431* (2013.01); *G06F 3/1438* (2013.01); *G09G 2380/14* (2013.01)

(58) Field of Classification Search
USPC ................................................ 345/173–182
See application file for complete search history.

(56) References Cited

U.S. PATENT DOCUMENTS

| | | | |
|---|---|---|---|
| 2009/0322689 A1* | 12/2009 | Kwong et al. | 345/173 |
| 2010/0229089 A1* | 9/2010 | Narita | 715/702 |
| 2010/0245275 A1* | 9/2010 | Tanaka | 345/173 |
| 2010/0259494 A1 | 10/2010 | Kii | |

FOREIGN PATENT DOCUMENTS

| | | | |
|---|---|---|---|
| JP | 2005-092476 A | 4/2005 | |
| JP | 2010-238148 A | 10/2010 | |
| JP | 2010-250463 A | 11/2010 | |

OTHER PUBLICATIONS

Office Action dated May 15, 2014 issued in counterpart Japanese application No. 2011-015112A.

* cited by examiner

*Primary Examiner* — Kenneth B Lee, Jr.

(74) *Attorney, Agent, or Firm* — Procopio, Cory, Hargreaves & Savitch LLP

(57) ABSTRACT

A portable communication terminal equipped with a first touch panel and a second touch panel that are switchable between a side-by-side configuration and a non-side-by-side configuration, and when (i) a contact point is detected on each of the first touch panel and the second touch panel in a same detection cycle and (ii) a distance between the contact points is within a predetermined range, the portable communication terminal displays an object on at least one of the first touch panel and the second touch panel based on one pair of position coordinates obtained based on two pairs of coordinates of the contact points.

14 Claims, 4 Drawing Sheets

PORTABLE COMMUNICATION TERMINAL AND DISPLAY METHOD

CROSS REFERENCE TO RELATED APPLICATION

The present application claims priority under 35 U.S.C. Section 119 to Japanese Patent Application No. 2011-015112, filed on Jan. 27, 2011. The disclosure of the above application is incorporated herein by reference.

TECHNICAL FIELD

The present invention relates to a portable communication terminal equipped with a plurality of touch panels as input units, and in particular to improvements to a user interface thereof.

BACKGROUND ART

Portable communication terminals equipped with two touch panels are known. In such a portable communication terminal, there are cases where the two touch panels need to serve as a single touch panel. In such cases, however, since each of the two touch panels is independent hardware and they are controlled separately, there has been a problem that it is difficult to move an object such as an icon displayed on one touch panel to the other. Generally, to drag an object displayed on a touch panel, a user first touches the object on the touch panel with a finger. The object moves as the contact point touched by the user's finger moves, and stops when the contact breaks as the user releases the finger. Hence, even when the user wishes to move an object from one touch panel to the other, the object stops at the position on the former touch panel where the contact breaks.

Patent Literature 1, for example, discloses a method as one approach to this problem. According to this method, a plurality of touch panels are managed as a single touch panel by using an integrated coordinate system. To move an object displayed on a first touch panel to a second touch panel, the user first touches the object displayed on the first touch panel with one hand, and while doing so, touches the second touch panel with the other hand, and then releases the hand from the first touch panel. In addition, Patent Literature 2, for example, discloses a portable communication terminal that reduces the load on a user of moving an object between two touch panels.

CITATION LIST

Patent Literature

[Patent Literature 1] Japanese Patent Application Publication No. 2005-092476
[Patent Literature 2] Japanese Patent Application Publication No. 2010-238148

SUMMARY OF INVENTION

Technical Problem

The method disclosed in Patent Literature 1 is, however, problematic in view of the usability, because when a user moves an object from one touch panel to the other touch panel, the user needs to perform a different operation than in the case of moving an object within a single touch panel.

The present invention is made in view of the problem described above, and aims to provide a portable communication terminal that allows a user to perform dragging and the likes from one touch panel to another among a plurality of touch panels.

Solution to Problem

To achieve the aim, one aspect of the present invention is a portable communication terminal equipped with a first touch panel and a second touch panel that are switchable between a side-by-side configuration and a non-side-by-side configuration, and having a function to move an object displayed on either touch panel, during a period from when contact is made on the object until the contact breaks, in synchronization with movement of a contact point on the object, the portable communication terminal comprising: a position acquiring unit acquiring positions of contact points on the first touch panel and the second touch panel; a determination unit, when the position acquiring unit acquires a position of a contact point on each of the first touch panel and the second touch panel, determining whether a distance between the contact points is within a first range, and when determining affirmatively, obtaining one pair of position coordinates based on the positions of the contact points acquired by the position acquiring unit; and a display processing unit displaying the object on at least one of the first touch panel and the second touch panel based on the pair of position coordinates obtained by the determination unit.

Advantageous Effects of Invention

The portable communication terminal pertaining to the present invention having the stated structure allows a user to perform dragging and the likes from one touch panel to another among a plurality of touch panels.

DESCRIPTION OF EMBODIMENT

<Embodiment>

The following explains a portable communication terminal 100 pertaining to an embodiment of the present invention.

<Overview>

First, description is made on the configuration of the portable communication terminal 100 pertaining to the embodiment.

Figure 1A:
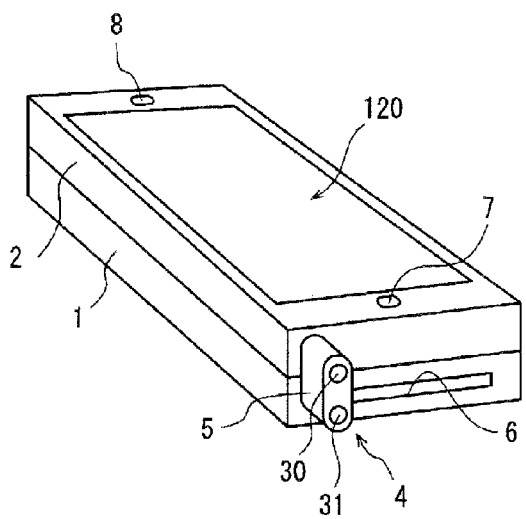
FIGS. 1A, 1B and 1C each show an appearance of a portable communication terminal 100 pertaining to Embodiment.
Figure 1B:
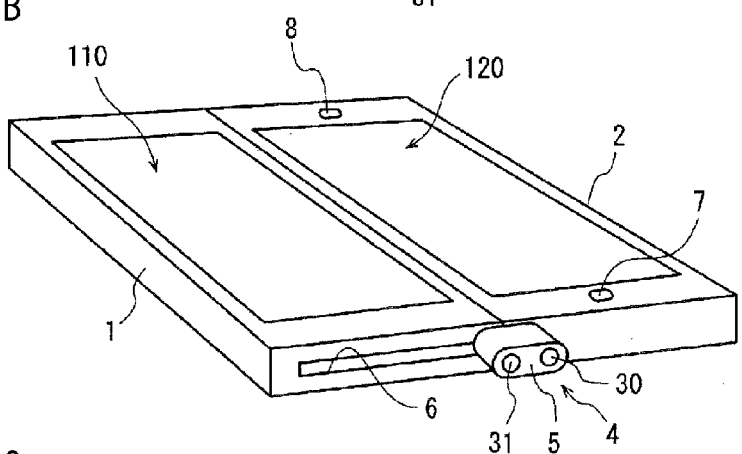
Figure 1C:
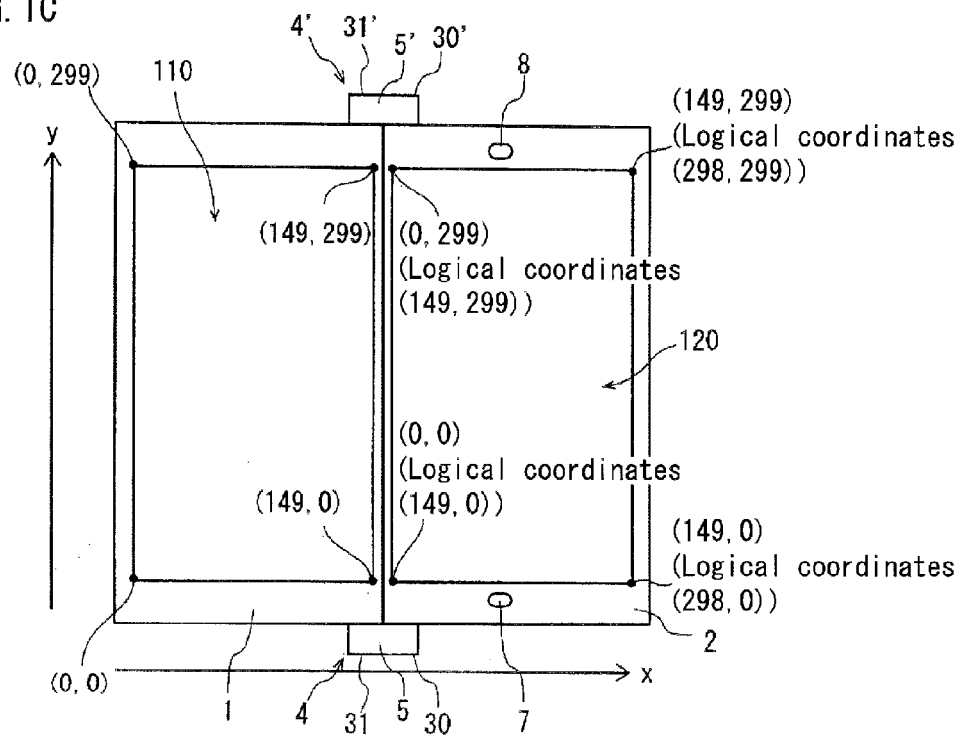

FIG. 1A is a perspective view showing an appearance of the portable communication terminal 100 in a closed state. FIG. 1B is a perspective view showing an appearance of the portable communication terminal 100 in an open state. FIG. 1C is a front elevational view showing an appearance of the portable communication terminal 100 in an open state.

As shown in FIGS. 1A, 1B and 1C, the portable communication terminal 100 is a sliding-type terminal including a first housing 1, a second housing 2 and coupling mechanisms 4 and 4'. The first housing 1 and the second housing 2 are movable relative to each other. Each of the coupling mechanisms 4 and 4' couples the first housing 1 and the second housing 2 together.

The first housing 1 includes a touch panel 110 of a capacitance type, and the second housing 2 includes a touch panel 120 of a capacitance type, a microphone 7, and a speaker 8.

As shown in FIGS. 1A and 1B, a guide groove 6 is formed in a lateral side of the first housing 1 on which the coupling mechanism 4 is provided. Similarly, another guide groove is formed in another lateral side of the first housing 1 on which the coupling mechanism 4' is provided.

As shown in FIGS. 1A and 1B, the coupling mechanism 4 has a coupling piece 5 and pins 30 and 31 to couple a lateral side of the first housing 1 and a lateral side of the second housing 2. Similarly, as shown in FIG. 1C, the coupling mechanism 4' has a coupling piece 5' and pins 30' and 31'.

The pins 30 and 30' are each pivotally supported by the second housing 2. Each of the pins 31 and 31' engages with a corresponding guide groove. By each of the pins 31 and 31' sliding along the corresponding guide groove, the first housing 1 and the second housing 2 move relative to each other.

As shown in FIG. 1A, when the portable communication terminal 100 is in the closed state, the second housing 2 is located on the first housing 1 and the touch panel 110 can not be seen. The portable communication terminal 100 comes into the open state from the closed state in the following manner: (i) the second housing 2 is moved along the surface of the first housing 1 while the pins 31 and 31' of the coupling mechanisms 4 and 4' slide along the guide grooves; and (ii) the pins 30 and 30' are rotated about the pins 31 and 31' respectively, and consequently, as shown in FIGS. 1B and 1C, the surface of the first housing 1 and the surface of the second housing 2 are aligned in substantially the same plane. In the open state, the touch panels 110 and 120 are arranged side by side.

The following explains examples of user operations and operations by the portable communication terminal 100 when the two touch panels are arranged side by side.

Assume the case where a user moves an icon displayed on the touch pane 110 to the touch panel 120. While the user's finger, touching on the icon, is sliding on the touch panel 110, the portable communication terminal 100 moves the display position of the icon in synchronization with the movement of the contact point on the icon touched by the user's finger. When the user's finger, touching on the icon, moves across the border between the touch panel 110 and the touch panel 120, the user's finger has contact with both touch panels, because the touch panels are adjacent to each other. In such a situation, average position coordinates are calculated from the coordinates of the contact points on both touch panels, and the icon is displayed at the position corresponding to the average position coordinates. In other words, when contact is detected on both the touch panel 110 and the touch panel 120 and the contact points are close to each other, the icon does not stops on the touch panel 110 and moves onto the touch panel 120. In the case where the user releases the finger from the touch panel 110, if no contact is detected on the touch panel 120, the icon stops at the position where the user releases the finger from the touch panel 110.

With such operations, the user can move an icon from one touch panel to the other in the same manner as moving an icon within a single touch panel. Also, the user can stop the icon within a single touch panel.

<Functional Structure>

The following explains a functional structure of the portable communication terminal 100.

Figure 2:
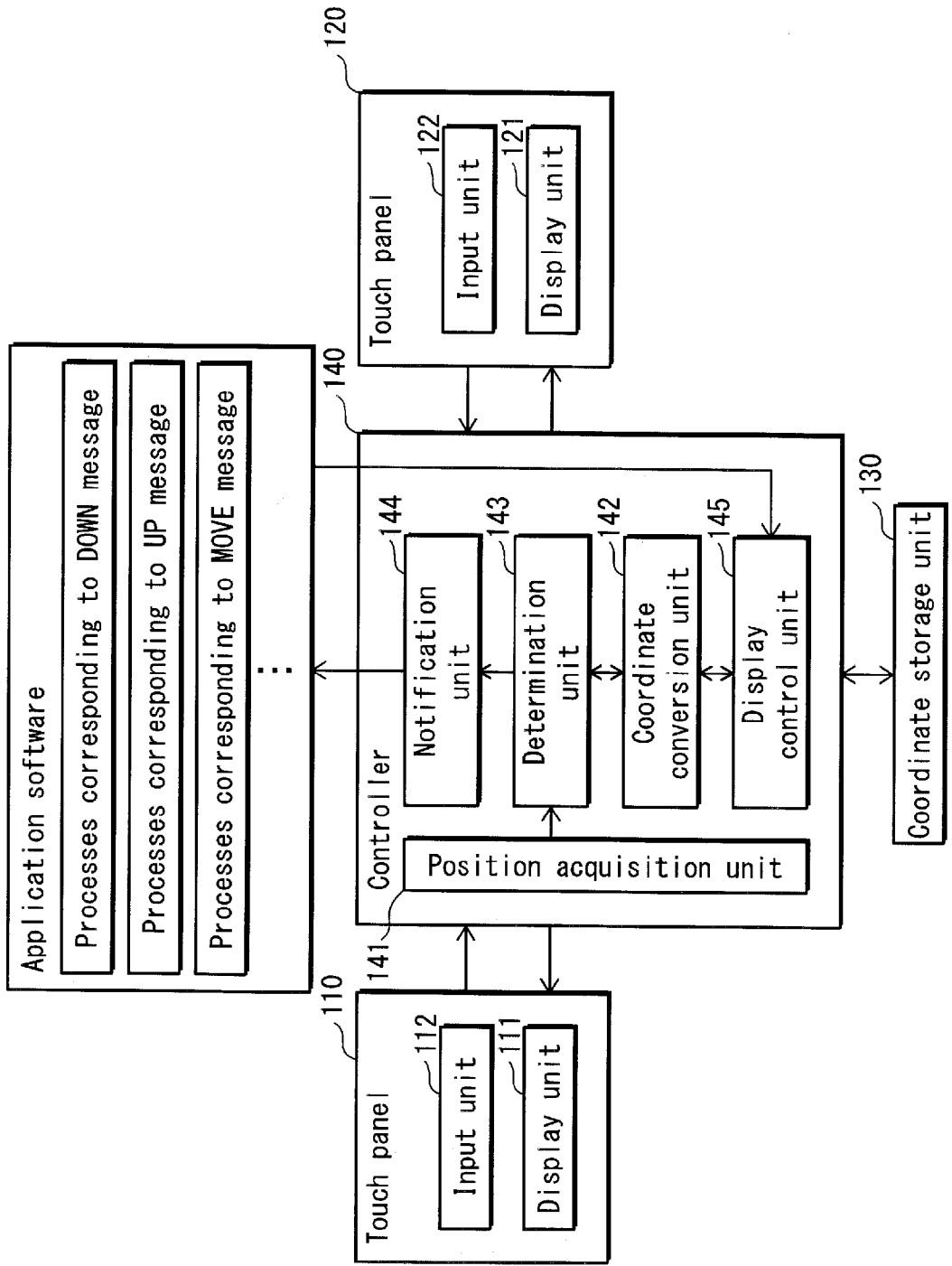
FIG. 2 is a block diagram showing a functional structure of main components of the portable communication terminal 100.

FIG. 2 is a block diagram showing a functional structure of main components of the portable communication terminal 100.

The portable communication terminal 100 includes a processor and a memory. In terms of the functionality, the portable communication terminal 100 includes a touch panel 110, a touch panel 120, a coordinate storage unit 130, and a controller 140.

The touch panel 110 has a display unit 111 and an input unit 112. The touch panel 120 has a display unit 121 and an input unit 122. Each display unit includes an LCD (Liquid Crystal Display). Each display unit is a circuit for displaying images such as characters and icons on the LCD according to instructions from the controller 140. In the following description, it is assumed that the number of pixels (horizontal×vertical) in the LCD of each display unit (111, 121) is 150×300.

The input unit 112 and the input unit 122 each include a touch sensor of a capacitance type. When detecting contact with a user's finger or the like, each of the input units 112 and 122 sends physical coordinates of the contact point to the controller 140.

The controller 140 is embodied with the processor executing middleware, which mediates between each touch panel and application software. The controller 140 manages the sizes, the shapes and the positions (coordinates) of icons displayed on each touch panel, and has a function to transmit a message corresponding to the user's operation on the touch panel to the application software that performs display control.

The controller 140 includes a position acquisition unit 141, a coordinate conversion unit 142, a determination unit 143, a notification unit 144, and a display control unit 145.

The position acquisition unit 141 has a function to acquire physical coordinates of a contact point from each of the input unit 112 and the input unit 122 in cycles with a predetermined period (e.g. every 1/60 sec.).

The coordinate conversion unit 142 has a function to convert physical coordinates to logical coordinates to manage two touch panels as a single touch panel when the position acquisition unit 141 acquires physical coordinates from the input unit 122.

The following explains about logical coordinates.

Logical coordinates are coordinates used for managing the adjacent two touch panels 110 and 120 as a single touch panel. As shown in FIG. 1C, logical coordinates are defined in a coordinate system with reference to the x axis extending in the horizontal direction and the y axis extending in the vertical direction, where the coordinates at the lower left of the touch panel 110 are defined as (0,0).

The drawing shows examples of logical coordinates. The coordinate conversion unit 142 converts the physical coordinates (0,0), (0,299), (149,0) and (149,299) to logical coordinates (149,0), (149,299), (298,0) and (298,299), respectively. Note that the physical coordinates (0,0), (0,299), (149,0) and (149,299) correspond to the lower left point, the upper left point, the lower right point, and the upper right point of the touch panel 120, respectively.

In this example, physical coordinates and logical coordinates on the touch panel 110 are the same. Hence, the coordinate conversion unit 142 converts only physical coordinates on the touch panel 120. In the following description, however, physical coordinates on the touch panel 110 after being acquired by the position acquisition unit 141 are referred to as logical coordinates, in order to simplify the explanation.

Note that the application software performs processing based on logical coordinates. With such operations, even though there are two touch panels, the application software is enabled to perform display control in the same manner as with the case where there is only one touch panel.

When contact is detected on both touch panels, in other words, when the position acquisition unit 141 acquires a pair of physical coordinates from each of the touch panels, the determination unit 143 determines whether or not the contact points on the touch panels are close to each other.

If the contact points are close, the determination unit 143 obtains one pair of position coordinates based on the two pairs of logical coordinates of the two contact points. If the contact points are not close, the determination unit 143 determines that only one of the two contact points is effective.

Here, the determination unit 143 calculates the distance between the contact points based on the logical coordinates of the contact points, and determines that the contact points are close if the distance is shorter than a width of a pad of a finger (e.g. approximately 1 cm). Note that the determination unit 143 has been given a threshold (in units of pixels) corresponding to 1 cm for example, and performs the determination by using the threshold.

The determination unit 143 identifies the user's operation based on the logical coordinates of the contact point detected in the previous cycle and the logical coordinates of the contact point detected in the current cycle. Note that the phrase "detected in the previous cycle" means that the contact point is detected in the cycle immediately preceding the current cycle in the detection cycles of the touch panel, and the phrase "detected in the current cycle" means that the contact point is detected in the current cycle in the detection cycles of the touch panel.

There are three types of user's operations. One operation is a "DOWN" operation, by which the user touches the touch panel with a finger or the like. Another operation is an "UP" operation, by which the user release the finger or the like to break the contact. The other operation is a "MOVE" operation, which is performed during a period from when the contact is made until the contact breaks. Note that, in the following description, an operation performed during a period from when the contact is made until the contact breaks is always referred to as a MOVE operation, even if the contact point does not change in position.

When the determination unit 143 detects contact in the current cycle, if the determination unit 143 has not detected contact in the previous cycle or the distance between the contact points detected in the current cycle and the previous cycle is not within a predetermined range (for example, within three pixels), the determination unit 143 determines that the user's operation is a DOWN operation. The predetermined range discussed here has been determined based on the distance by which a contact point could be moved in the period of the cycles in which the position acquisition unit 141 attempts to acquire a pair of position coordinates.

When contact is detected, if the distance between the contact points detected in the current cycle and the previous cycle is within the predetermined range, the determination unit 143 determines that the user's operation is a MOVE operation. Furthermore, when no contact is detected in the current cycle, if contact has been detected in the previous cycle, the determination unit 143 determines that the user's operation is an UP operation.

The notification unit 144 has a function to send a message to the application software. A message includes information on the user's operation identified by the determination unit 143 and the logical coordinates. Specifically, the notification unit 144 issues a DOWN message if the operation is identified as a DOWN operation by the determination unit 143. The notification unit 144 issues a MOVE message if the operation is identified as a MOVE operation by the determination unit 143. The notification unit 144 issues an UP message if the operation is identified as a UP operation by the determination unit 143.

The application software performs processes corresponding to the message received from the notification unit 144, and sends, to the display control unit 145, an instruction relating to presentation of an object, for example.

The display control unit 145 has a function to control presentation on the touch panels 110 and the touch panel 120 according to instructions from the application software.

The coordinate storage unit 130 is a memory for storing a pair of coordinates. The pair of coordinates stored in the coordinate storage unit 130 is used as the logical coordinates detected in the previous cycle. By using these coordinates, the controller 140 identifies the user's operation. Afterward, when the notification unit 144 issues a MOVE message or a DOWN message, the pair of coordinates is updated by the notification unit 144 to the logical coordinates of the contact point detected in the current cycle. If the notification unit 144 does not issue a DOWN message after issuing an UP message, the logical coordinates stored in the coordinate storage unit 130 are deleted by the notification unit 144.

<Operations>

The following explains operations of the portable communication terminal 100 when dragging is performed on the two touch panels arranged side by side.

Figure 3:
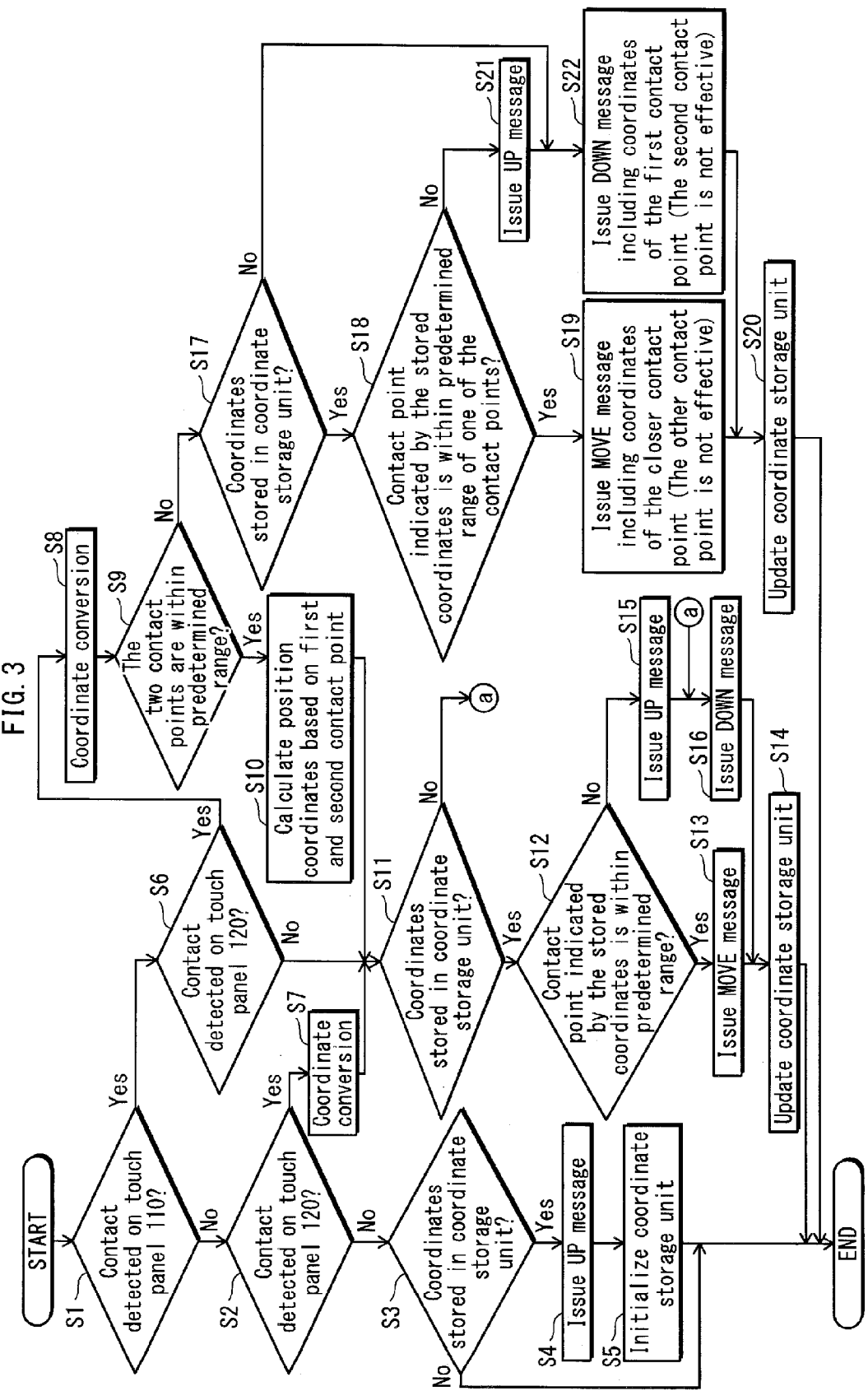
FIG. 3 is a flowchart showing control processing performed by the portable communication terminal 100.

FIG. 3 is a flowchart showing operations performed by the portable communication terminal 100.

When the position acquisition unit 141 of the controller 140 does not acquire physical coordinates from the touch panel 110 (Step S1: NO) and does not acquire physical coordinates from the touch panel 120 in the same cycle (Step S2: NO) (i.e. when contact is detected on neither of the touch panels in the same cycle), the determination unit 143 determines whether a pair of logical coordinates has been stored in the coordinate storage unit 130 (Step S3). When no logical coordinates has been stored in the coordinate storage unit 130 (Step S3: NO), the controller 140 ends the processing without performing any operation.

When a pair of logical coordinates have been stored in the coordinate storage unit 130 (Step S3: YES), the notification unit 144 sends, to the application software, an UP message including the logical coordinates stored in the coordinate storage unit 130 (Step S4) and deletes the logical coordinates stored in the coordinate storage unit 130 (Step S5), and the controller 140 ends the processing.

When the position acquisition unit 141 acquires a pair of physical coordinates from the touch panel 110 (Step S1: YES) but does not acquire physical coordinates from the touch panel 120 in the same cycle (Step S6: NO) (i.e. when contact is detected only on the touch panel 110 in the same cycle), the determination unit 143 determines whether a pair of logical coordinates has been stored in the coordinate storage unit 130 (Step S11). When no logical coordinates has been stored in the coordinate storage unit 130 (Step S11: NO), the controller 140 ends the processing without performing any operation.

When a pair of logical coordinates has been stored in the coordinate storage unit 130 (Step S11: YES), the determination unit 143 further determines whether the distance between the point indicated by the logical coordinates and the contact point detected in the current cycle is within a predetermined range (Step S12).

When the distance is within the predetermined range (Step S12: YES), the notification unit 144 sends, to the application software, a MOVE message including the logical coordinates of the contact point detected in the current cycle (Step S13)

and updates the coordinates stored in the coordinate storage unit 130 to the logical coordinates acquired in the current cycle (Step S14), and the controller 140 ends the processing.

When the distance is not within the predetermined range (Step S12: NO), the notification unit 144 sends, to the application software, an UP message including the logical coordinates stored in the coordinate storage unit 130 (Step S15), and a DOWN message including the logical coordinates of the contact point detected in the current cycle (Step S16). After that, the notification unit 144 updates the logical coordinates stored in the coordinate storage unit 130 to the logical coordinates acquired in the current cycle (Step S14), and the controller 140 ends the processing.

When the position acquisition unit 141 does not acquire physical coordinates from the touch panel 110 (Step S1: NO) but acquires physical coordinates from the touch panel 120 in the same cycle (Step S2: YES) (i.e. when contact is detected only on the touch panel 120), the coordinate conversion unit 142 converts the physical coordinates acquired by the position acquisition unit 141 to logical coordinates (Step S7).

After that, in the same manner as in the case where physical coordinates are acquired only from the touch panel 110, the determination unit 143 identifies the user's operation, and the notification unit 144 sends, to the application software, a message including information on the user's operation identified by the determination unit 143 and the logical coordinates (Step S11 to Step S16).

When the position acquisition unit 141 acquires physical coordinates from the touch panel 110 (Step S1: YES) and also acquires physical coordinates from the touch panel 120 in the same cycle (Step S6: YES) (i.e. when contact is detected on both the touch panel 110 and the touch panel 120), the coordinate conversion unit 142 first converts the physical coordinates acquired from the touch panel 120 to logical coordinates (Step S8).

After that, the determination unit 143 determines whether the points indicated by the two pairs of logical coordinates acquired in the current cycle are close to each other (Step S9). When the points indicated by the two pairs of logical coordinates are close to each other (Step S9: YES), the determination unit 143 obtains one pair of position coordinates based on the two pairs of logical coordinates (Step S10). Here, the determination unit 143 obtains the average of the two pairs of logical coordinates as the position coordinates of the current contact point.

After that, in the same manner as in the case where physical coordinates are acquired only from one of the touch panels, the determination unit 143 identifies the user's operation, and the notification unit 144 sends, to the application software, a message including information on the user's operation identified by the determination unit 143 and the logical coordinates (Step S11 to Step S16).

When the points indicated by the two pairs of logical coordinates are not close to each other (Step S9: NO), the determination unit 143 determines whether a pair of logical coordinates has been stored in the coordinate storage unit 130 (Step S17).

When no logical coordinates has been stored in the coordinate storage unit 130 (Step S17: NO), the notification unit 144 sends, to the application software, a DOWN message including the logical coordinates on the touch panel 110 (Step S22) and updates the coordinates stored in the coordinate storage unit 130 to the logical coordinates on the touch panel 110 (Step S20), and the controller 140 ends the processing.

When a pair of logical coordinates has been stored in the coordinate storage unit 130 (Step S17: YES), the determination unit 143 further determines whether the distance between the point indicated by the logical coordinates and the contact point currently detected is within the predetermined range (Step S18).

When the distance is within the predetermined range (Step S18: YES), the notification unit 144 sends, to the application software, a MOVE message including the pair of logical coordinates that is closer than the other pair to the logical coordinates stored in the coordinate storage unit 130 (Step S19) and updates the pair of logical coordinates to the closer pair (Step S20), and the controller 140 ends the processing.

When the distance is not within the predetermined range (Step S18: NO), the notification unit 144 sends, to the application software, an UP message including the logical coordinates stored in the coordinate storage unit 130 (Step S21). After that, the notification unit 144 sends, to the application software, a DOWN message including the logical coordinates on the touch panel 110 (Step S22) and updates the coordinates stored in the coordinate storage unit 130 to the logical coordinates on the touch panel 110 (Step S20), and the controller 140 ends the processing.

The application software, upon receipt of a message from the notification unit 144, executes processes corresponding to the received message, and sends an instruction to the display control unit 145. Specifically, when receiving a down message, the application software associates the contact with the object displayed on the touch panel. When receiving a MOVE message, the application software performs presentation of the object associated with the contact at the DOWN operation, based on the received logical coordinates. That is, the object moves from the contact point detected in the previous cycle to the point indicated by the logical coordinates received in the current cycle. When receiving an UP message, the application software displays the object at the point indicated by the received logical coordinates, and cancels the association with the object made at the DOWN operation. That is, the object stops at the point where the contact breaks on the touch panel, and when contact is made next time, it is considered as new contact.

When an instruction that the display control unit 145 has received from the application software includes logical coordinates, the coordinate conversion unit 142 converts the logical coordinates to physical coordinates. After that, the display control unit 145 displays the object on the touch panel 110 or the touch panel 120 according to the received instruction.

<Explanation of Operations based on a Specific Example>

The following explains, as an example operation of the portable communication terminal 100, an operation for the case where an icon 125 as an object displayed on the touch panel 110 is moved to the touch panel 120. This explanation is made with reference to FIGS. 4A to 4C, according to the flowchart shown in FIG. 3.

Figure 4A:
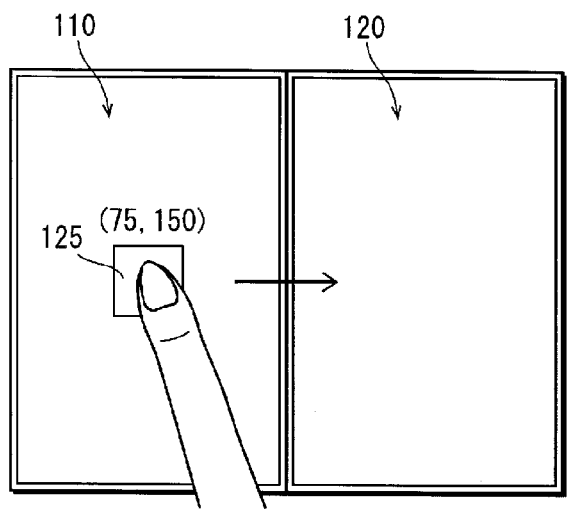
FIGS. 4A, 4B and 4C explain an example of dragging performed by a user on the portable communication terminal 100.

As shown in FIG. 4A, when the user touches on the icon 125 displayed on the touch panel 110 with a finger, the position acquisition unit 141 acquires physical coordinates (75, 150) from the input unit 112 (Step S1: YES, Step S6: NO). At this moment, since no logical coordinates has been stored in the coordinate storage unit 130 (Step S11: NO), the user's operation is identified as a DOWN operation, and the notification unit 144 sends, to the application software, a DOWN message including the logical coordinates (75,150) (Step S16). Then, the notification unit 144 updates the coordinates stored in the coordinate storage unit 130 to the logical coordinates (75,150) (Step S14).

Next, when the user drags the icon 125, the position acquisition unit 141 acquires physical coordinates (77,150) from the input unit 112 (Step S1: YES, Step S6: NO). At this moment, since a pair of logical coordinates (75,150) has been stored in the coordinate storage unit 130 (Step S11: YES), the determination unit 143 determines whether the distance between the point indicated by the logical coordinates stored in the coordinate storage unit 130 and the contact point indicated by the logical coordinates (77,150), which is currently detected by the position acquisition unit 141 (Step S12), is within the predetermined range. In this example, the distance is within the predetermined range (Step S12: YES). Hence, the determination unit 143 determines that the user's operation is a MOVE operation, and the notification unit 144 sends, to the application software, a MOVE message including the logical coordinates (77,150) (Step S13). Then, the notification unit 144 updates the coordinates stored in the coordinate storage unit 130 to the logical coordinates (77,150) (Step S14).

Figure 4B:
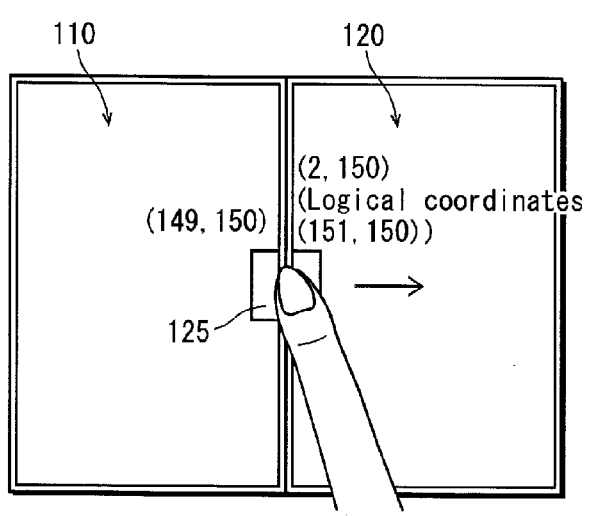

If the user keeps dragging the icon 125, and the icon 125 is moved from one touch panel to the other as shown in FIG. 4B, the position acquisition unit 141 acquires physical coordinates (149,150) from the input unit 112, and acquires physical coordinates (2,150) from the input unit 122 (Step S1: YES, Step S6: YES). The coordinate conversion unit 142 converts the physical coordinates (2,150) acquired from the input unit 122 to logical coordinate (151,150) (Step S8). In this example, since the point indicated by the logical coordinates (149,150) and the point indicated by the logical coordinates (151,150) are close to each other (Step S9: YES), their average coordinates, namely logical coordinates (150,150), are obtained as the position coordinates of the current contact point (Step S10). Also, since the distance between the point indicated by the logical coordinates stored in the coordinate storage unit 130 (in this example, logical coordinates (148, 150)) and the point indicated by the logical coordinates (150, 150) is within the predetermined range (Step S11: YES, Step S12: YES), the determination unit 143 identifies the user's operation as a MOVE operation, and the notification unit 144 sends, to the application software, a MOVE message including the logical coordinates (150,150) (Step S13).

Note that although FIG. 4B shows an example case where the icon 125 is displayed on both the touch panels 110 and the touch panel 120 across the border therebetween, if contact is detected on both the touch panel 110 and the touch panel 120 and the contact points are close and the distance between them is within the predetermined range (Step S1: YES, Step S6: YES, Step S9: YES), the icon 125 could be displayed on either one of the touch panel 110 or the touch panel 120, depending on the position on the icon 125 where is touched by the user's finger.

Figure 4C:
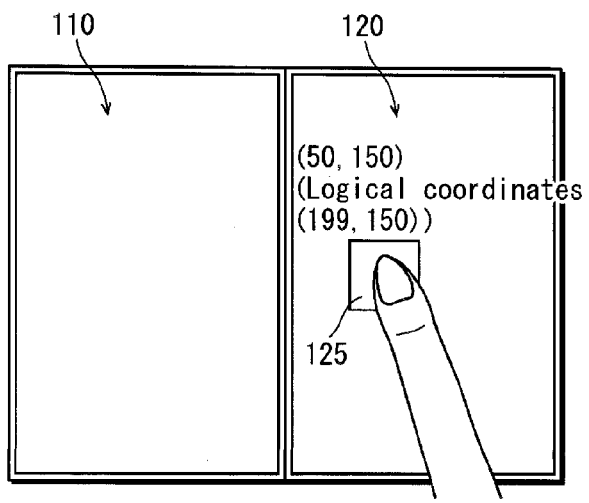

After that, if the user keeps dragging the icon 125 on the touch panel 120 and the icon 125 is moved to the position shown in FIG. 4C, the position acquisition unit 141 acquires physical coordinates (50,150) from the input unit 122 (Step S1: NO, Step S2: YES), and sends the physical coordinates (50,150) to the coordinate conversion unit 142. The coordinate conversion unit 142 converts the received physical coordinates (50,150) to logical coordinates (199,150) (Step S7). The determination unit 143 compares the logical coordinates stored in the coordinate storage unit 130 (in this example, logical coordinates (198,150)) with the logical coordinates (199,150), and determines that the distance between the points respectively indicated by the two pairs of coordinates is within the predetermined range (Step S12: YES). The determination unit 143 sends, to the application software, a MOVE message including the logical coordinates (199,150) (Step S13). Then, the notification unit 144 updates the coordinates stored in the coordinate storage unit 130 to the logical coordinates (199,150) (Step S14).

At this moment, if the user releases the finger from the touch panel 120, the position acquisition unit 141 does not acquire physical coordinates from any of the touch panel 110 or the touch panel 120 (Step S1: NO, Step S2: NO). Since the determination unit 143 determines that a pair of logical coordinates has been stored in the coordinate storage unit 130 (Step S3: YES), the notification unit 144 sends, to the application software, an UP message including the logical coordinates stored in the coordinate storage unit 130 (Step S4). Then, the notification unit 144 deletes the logical coordinates stored in the coordinate storage unit 130 (Step S5).

<Supplemental Descriptions>

Although the description above explains the portable communication terminal 100 as an embodiment of the present invention, the present invention is not limited to the embodiment, and the following modifications may be applied to the portable communication terminal 100, as a matter of course.

(1) In the embodiment described above, the portable communication terminal is a sliding-type terminal. The present invention, however, is not limited to this type. The present invention may be applied to any portable communication terminals having two touch panels that are movable and can be arranged side by side. For example, the portable communication terminal may have an appearance of a foldable type terminal.

Although the LCD included in each display unit of the embodiment described above has approximately a rectangle shape, it may have another shape, such as a circular shape, or a polygonal shape.

In the embodiment above, it is assumed that the number of pixels included in the LCD of each display unit is 150×300 (horizontal×vertical). However, the number of the pixels is not limited to this. The number of pixels can be altered according to the need.

Also, although it is assumed in the above description that an LCD is included in each display unit, an organic EL (Electro-Luminescence) display or the like may be included in the display unit.

(2) In the description above, it is assumed that the controller is embodied with a processor executing middleware, the controller may be embodied with application software, an operation system, or the like.

(3) In the description above, it is assumed that each input unit includes a touch sensor of a capacitance type. As such a capacitance-type touch sensor, an appropriate type is to be selected from various types of capacitance-type touch sensors. Capacitance type touch sensors include: a projection type touch sensor which includes multiple electrode patterns formed on a substrate composed of plastic, glass or the like and which detects contact points thereon by measuring ratios of amperages between different electrode patterns in the vicinity of the contact points; a surface type touch sensor which includes a conductive layer, a substrate, and electrodes provided to the edges of the substrate, in which a uniform electrostatic field is formed by the conductive layer, and which detects contact points thereon by measuring a ratio between the amperages of the electrodes caused by contact made by a finger or the like.

Further, each input unit does not necessarily include a touch sensor of a capacitance type. Alternatively, the input unit of each touch panel may be embodied as: an electromagnetic induction type, a matrix switch type, a resistive type, a surface acoustic wave type, an infrared type, an optical sensor type or the like. The electromagnetic induction type is a type that requires the use of a special pen such as an electronic pen. The matrix switch type is composed of transparent electrodes having two-layer structures. The resistive type includes two resistive layers, and voltage is applied to one resistive layer and the other resistive layer detects changes in voltage according to changes in location of the contact point. The surface acoustic wave type detects contact made by a finger or the like by detecting the reflection of ultrasonic waves by monitoring the voltage changes of piezoelectric elements. The infrared type detects contact made by a finger or the like by using shielded infrared beams. The optical sensor type detects contact points by using an optical sensor provided to the screen.

(4) In the description above, it is assumed that the width of a finger pad, which is used for determining the distance between the contact points, is approximately 1 cm. However, it may be assumed that the width of a finger pad is approximately 2 cm, in order to support the use with a thick finger. Alternatively, the portable communication terminal may be provided with a function to register the size of the user's finger, and may determine the range corresponding to the width of a finger pad based on the registered size.

In the description above, it is assumed that whether the distance between the contact points on the touch panels is shorter than a width of a finger pad is determined based on a threshold (in units of pixels) corresponding to 1 cm for example, and this threshold has been given to the determination unit 143. However, the present invention is not limited to this. For example, the determination may be performed after converting the measurement unit of distance into centimeters by using the sizes of the touch panels and the resolution of the images on the touch panels when calculating the distance based on the logical coordinates.

(5) In the description above, the gap between the two touch panels is considered as ignorable, and 149 is added to the x-axis component of the physical coordinates on the touch panel 120 to obtain the logical coordinates. However, logical coordinates may be calculated with consideration of the gap. For example, 160 may be added to the x-axis component of the physical coordinates on the touch panel 120 to obtain the logical coordinates.

(6) Embodiment described above is based on the case of moving an icon. However, objects displayed on the touch panels are not limited to icons, and may be windows, images, or the likes.

(7) In the description above, it is assumed that the portable communication terminal supports a single touch technology by which only a single touch is determined to be effective for the two touch panels at a time. However, the portable communication terminal may support a single touch technology by which a single touch on each touch panel is determined to be effective at a time, or a multi-touch technology. If this is the case, the number of pairs of coordinates that the coordinate storage unit stores is the number of the contact points that the potable communication terminal can support. When contact is detected, the contact point is associated with the pair of logical coordinates that is closest to the contact point among the pairs of logical coordinates stored in the coordinate storage unit, the same operations as described as for Embodiment are performed. For example, when the coordinate storage unit stores logical coordinates (50,50) and logical coordinates (100,150), and the position acquisition unit acquires logical coordinates (52,51) and logical coordinates (200,100), the determination unit determines, in regard to the logical coordinates (52,51), that a MOVE operation has been performed, because the logical coordinates (50,50) is stored in the coordinate storage unit. In regard to the logical coordinates (200, 100), since the coordinate storage unit stores no logical coordinates corresponding to the point within the predetermined range, the determination unit determines that a DOWN operation has been performed. In regard to the logical coordinates (100,150), the determination unit determines that an UP operation has been performed.

(8) In the description above, when contact is detected on both the touch panel 110 and the touch panel 120 and the contact points are not close to each other, one of the contact points is determined to be not effective. However, when the portable communication terminal supports a single touch technology by which a single touch on each touch panel is determined to be effective at a time, or a multi-touch technology, the other contact point may be determined to be effective.

(9) In the description above, when a contact point on the touch panel 110 and a contact point on the touch panel 120 are determined to be close to each other, the logical coordinates of the contact points are averaged to obtain position coordinates. However, the positional coordinate may be obtained in a different manner. For example, the portable communication terminal may be provided with a function to measure the intensity of contact, and the coordinates of one of the contact points with a higher intensity may be determined as the position coordinates.

(10) The components described above may be partially or entirely embodied as an integrated circuit having one chip or multiple chips. Further, the components may also be embodied as a computer program or in any form.

Further, the components described above cooperate with the processor included in the portable communication terminal, and thereby realize the functions thereof.

(11) It may be conceived to distribute a program for causing a processor to execute the processing performed by the portable communication terminal as described above (see FIG. 3). The distribution of such a program may be realized by recording the program onto recording media, or transmitting the program via various communication paths. The recording media which may be used in such distribution of the program include IC cards, hard disks, optical discs, flexible disks, ROMs, flash memories, and the likes. The distributed program is to be stored to a memory or the like which may be read by the processor provided to devices, so that the processor may access and execute the program. Thereby, each of the functions of each of the portable communication terminal described above is to be realized.

(12) Combinations of part or all of the modifications (1) through (11) may be applied to the portable communication terminal described above.

(13) In the following, description is provided on a structure of a portable communication terminal as an embodiment of the present invention as well as modifications thereof. Additionally, description is made on the advantageous effects of such a portable communication terminal.

(a) As shown in FIG. 2, a portable communication terminal pertaining to an embodiment of the present invention is a portable communication terminal equipped with a first touch panel and a second touch panel that are switchable between a side-by-side configuration and a non-side-by-side configuration, and having a function to move an object displayed on either touch panel, during a period from when contact is made on the object until the contact breaks, in synchronization with movement of a contact point on the object, the portable communication terminal comprising: a position acquiring unit acquiring positions of contact points on the first touch panel and the second touch panel; a determination unit, when the position acquiring unit acquires a position of a contact point on each of the first touch panel and the second touch panel, determining whether a distance between the contact points is within a first range, and when determining affirmatively, obtaining one pair of position coordinates based on the positions of the contact points acquired by the position acquiring unit; and a display processing unit displaying the object on at least one of the first touch panel and the second touch panel based on the pair of position coordinates obtained by the determination unit. Note that the "display processing unit" above corresponds to the display control unit and the application software described in Embodiment.

With the stated structure, on the border between the two touch panels, two contact points within a predetermined range are managed as a single contact. Thus, the two touch panels can be managed as a single touch panel. Hence, the portable communication terminal pertaining to the embodiment of the present invention allows a user to perform dragging and the likes between the two touch panels.

(b) The position acquiring unit may attempt to acquire a position of a contact point on each of the first touch panel and the second touch panel in cycles, and when (i) the position acquiring unit acquires a position of a contact point on each of the first touch panel and the second touch panel in a same cycle and (ii) a distance between the contact points is within a range corresponding to a width of a human finger pad, the determination unit may determine that the distance between the contact points is within the first range. Note that the "range corresponding to a width of a human finger pad" corresponds to a width of a user's finger pad, which is assumed to be 1 cm in Embodiment above. The range varies from approximately 0.7 cm to approximately 2.0 cm.

With the stated structure, when two contact points on the border between two touch panels are close to each other and the distance between them is within a range corresponding to a human finger pad, the two contact points are managed as a single contact point. Hence, the user can perform dragging from one touch panel to the other in the same manner as with the case of dragging on a single touch panel.

(c) While contact is being made on an object displayed on the first touch panel, the display processing unit may move the object in synchronization with movement of a contact point on the object, and when the contact breaks and no contact is detected on the second touch panel, the display processing unit may stop the object at a position where the contact breaks.

With the stated structure, when contact is detected on only one of the touch panels and the contact breaks, the potable communication terminal detects that the contact breaks, and stops the object displayed on the touch panel at the position where the contact breaks. Hence, the portable communication terminal can avoid accepting dragging not intended by a user. For example, it can avoid the case where an icon moves to the second touch panel even though the user wishes to stop the icon within the first touch panel.

(d) While contact is being made on an object displayed on the first touch panel, the display processing unit moves the object in synchronization with movement of a contact point on the object, and when (i) the position acquiring unit acquires a position of a contact point on each of the first touch panel and the second touch panel, (ii) the determination unit determines that a distance between the contact points is within the first range and obtains one pair of position coordinates based on the positions of the contact points acquired by the position acquiring unit, and (iii) a distance between a point indicated by the pair of position coordinates and a contact point detected on the first touch panel immediately before the pair of position coordinates is obtained is within a second range, the display processing unit may display part of the object on the second touch panel based on the pair of position coordinates.

With the stated structure, when a contact point is detected on each of the two touch panels and the two contact points are close, one pair of position coordinates is obtained based on the positions of the two contact points. Hence, even if the contact on the first touch panel breaks afterward, the object does not stop within the first touch panel, since the distance between a point indicated by the pair of position coordinates and the contact point on the second touch panel is within the predetermined range. Thus, the portable communication terminal allows a user to perform dragging and the likes between the two touch panels.

(e) The portable communication terminal may further comprise a notification unit sending a message to the display processing unit, the message including the position coordinates and information on an operation made on the first touch panel and the second touch panel, wherein functions of the position acquiring unit, the determination unit, and the notification unit may be achieved by a processor executing middleware, and functions of the display processing unit may be achieved by the processor executing an application program.

With the stated structure, the notification unit notifies the display processing unit as application software of only one pair of coordinates obtained based on the two pairs of coordinates. Hence, the display processing unit can perform processing without considering that there are two touch panels.

(f) The portable communication terminal may further comprise a coordinate conversion unit converting coordinates of a contact point on at least one of the first touch panel and the second touch panel to logical coordinates used for managing the two touch panels as a single touch panel, wherein the determination unit may obtain, as the pair of position coordinates, average coordinates of the contact points based on the logical coordinates obtained by the coordinate conversion unit.

With the stated structure, the average coordinates of the two contact points close to each other are obtained as the pair of position coordinates. Hence, the portable communication terminal can display the object in a natural manner according to the user's operation.

Industrial Applicability

The present invention is applicable to a portable communication terminal equipped with two touch panels that are movable and can be arranged side by side.

Reference Signs List

1: first housing
2: second housing
4, 4': coupling mechanism
5, 5': coupling piece
6: guide groove
7: speaker
8. microphone
30, 30', 31, 31': pin
100: portable communication terminal
110, 120: touch panel
111, 121: display unit
121, 122: input unit
125: icon
130: coordinate storage unit
140: controller
141: position acquisition unit
142: coordinate conversion unit
143: determination unit 144: notification unit
145: display control unit

The invention claimed is:

1. A portable communication terminal equipped with a first touch panel and a second touch panel that are switchable between a side-by-side configuration and a non-side-by-side configuration, and having a function to move an object displayed on either touch panel, during a period from when contact is made on the object until the contact breaks, in synchronization with movement of a contact point on the object, the portable communication terminal comprising one or more modules that:
   acquire pairs of position coordinates representing positions of contact points on the first touch panel and the second touch panel, wherein each pair of position coordinates is defined according to a coordinate system that includes only the respective touch panel; and
   when a first pair of position coordinates for a contact point on the first touch panel and a second pair of position coordinates for a contact point on the second touch panel are simultaneously acquired,
      convert the first pair of position coordinates into a first pair of logical coordinates, and convert the second pair of position coordinates into a second pair of logical coordinates, wherein each pair of logical coordinates is defined according to a coordinate system that includes both the first touch panel and the second touch panel,
      determine a distance between the first pair of logical coordinates and the second pair of logical coordinates, and,
      when the determined distance is within a first range,
         calculate one pair of position coordinates based on the first pair of logical coordinates and the second pair of logical coordinates, and
         display the object on at least one of the first touch panel and the second touch panel based on the one pair of position coordinates.

2. The portable communication terminal of claim 1, wherein the one or more modules acquire a pair of position coordinates for a contact point on each of the first touch panel and the second touch panel in cycles,
   wherein simultaneously acquiring a first pair of position coordinates for a contact point on the first touch panel and a second pair of position coordinates for a contact point on the second touch panel comprises acquiring the first pair of position coordinates and the second pair of position coordinates in a same cycle, and
   wherein the first range represents a width of a human finger pad.

3. The portable communication terminal of claim 1, wherein while contact is being made on an object displayed on the first touch panel, the one or more modules move the object in synchronization with movement of a contact point on the object, and when the contact breaks and no contact is detected on the second touch panel, the one or more modules stop the object at a position where the contact breaks.

4. The portable communication terminal of claim 1, wherein the one or more modules further:
   while contact is being made on an object displayed on the first touch panel, move the object in synchronization with movement of a contact point on the object; and,
   when a first pair of position coordinates for a contact point on the first touch panel and a second pair of position coordinates for a contact point on the second touch panel are simultaneously acquired and it is determined that the distance is within the first range,
      determine a second distance between the one pair of position coordinates and a previous pair of position coordinates acquired immediately before the first pair of position coordinates and the second pair of position coordinates were simultaneously acquired, and,
      when the determined second distance is within a second range, move the object to a position corresponding to the one pair of position coordinates.

5. The portable communication terminal of claim 1, further comprising a notification unit sending a message to the one or more modules, the message including the position coordinates and information on an operation made on the first touch panel and the second touch panel, wherein functions of the acquiring, converting, determining, and calculating by the one or more modules and functions of the notification unit are achieved by a processor executing middleware, and functions of the displaying are achieved by the processor executing an application program.

6. The portable communication terminal of claim 1, wherein calculating the one pair of position coordinates based on the first pair of logical coordinates and the second pair of logical coordinates comprises:
   averaging the first pair of logical coordinates and the second pair of logical coordinates to obtain a third pair of logical coordinates; and
   converting the third pair of logical coordinates into the one pair of position coordinates.

7. A display method for a portable communication terminal equipped with a first touch panel and a second touch panel that are switchable between a side-by-side configuration and a non-side-by-side configuration, and having a function to move an object displayed on either touch panel, during a period from when contact is made on the object until the contact breaks, in synchronization with movement of a contact point on the object, the display method comprising:
   acquiring pairs of position coordinates representing positions of contact points on the first touch panel and the second touch panel, wherein each pair of position coordinates is defined according to a coordinate system that includes only the respective touch panel; and
   when a first pair of position coordinates for a contact point on the first touch panel and a second pair of position coordinates for a contact point on the second touch panel are simultaneously acquired,
      converting the first pair of position coordinates into a first pair of logical coordinates, and converting the second pair of position coordinates into a second pair of logical coordinates, wherein each pair of logical coordinates is defined according to a coordinate system that includes both the first touch panel and the second touch panel,
      determining a distance between the first pair of logical coordinates and the second pair of logical coordinates, and,
      when the determined distance is within a first range,
         calculating one pair of position coordinates based on the first pair of logical coordinates and the second pair of logical coordinates, and
         displaying the object on at least one of the first touch panel and the second touch panel based on the one pair of position coordinates.

8. The portable communication terminal of claim 4, wherein, when the determined second distance is not within the second range, the one or more modules stop the object at a position corresponding to the previous pair of position coordinates.

9. The display method of claim 7,
wherein the acquisition of a pair of position coordinates representing positions of contact points on the first touch panel and the second touch panel is performed in cycles,
wherein simultaneously acquiring a first pair of position coordinates for a contact point on the first touch panel and a second pair of position coordinates for a contact point on the second touch panel comprises acquiring the first pair of position coordinates and the second pair of position coordinates in a same cycle, and
wherein the first range represents a width of a human finger pad.

10. The display method of claim 7, further comprising:
while contact is being made on an object displayed on the first touch panel, moving the object in synchronization with movement of a contact point on the object; and,
when the contact breaks and no contact is detected on the second touch panel, stopping the object at a position where the contact breaks.

11. The display method of claim 7, further comprising:
while contact is being made on an object displayed on the first touch panel, moving the object in synchronization with movement of a contact point on the object; and,
when a first pair of position coordinates for a contact point on the first touch panel and a second pair of position coordinates for a contact point on the second touch panel are simultaneously acquired and it is determined that the distance is within the first range,
determine a second distance between the one pair of position coordinates and a previous pair of position coordinates acquired immediately before the first pair of position coordinates and the second pair of position coordinates were simultaneously acquired, and,
when the determined second distance is within a second range, move the object to a position corresponding to the one pair of position coordinates.

12. The display method of claim 11, further comprising, when the determined second distance is not within the second range, stopping the object at a position corresponding to the previous pair of position coordinates.

13. The display method of claim 7, wherein the functions of acquiring, converting, and calculating are performed by a processor executing middleware, and wherein the functions of displaying are performed by the processor executing an application program.

14. The display method of claim 7, wherein calculating the one pair of position coordinates based on the first pair of logical coordinates and the second pair of logical coordinates comprises:
averaging the first pair of logical coordinates and the second pair of logical coordinates to obtain a third pair of logical coordinates; and
converting the third pair of logical coordinates into the one pair of position coordinates.

\* \* \* \* \*